US008369381B2

(12) United States Patent
Fuente

(10) Patent No.: US 8,369,381 B2
(45) Date of Patent: *Feb. 5, 2013

(54) METHOD, TRANSMITTER AND RECEIVER FOR SPREAD-SPECTRUM DIGITAL COMMUNICATION BY GOLAY COMPLEMENTARY SEQUENCE

(76) Inventor: Vicente Diaz Fuente, Madrid (ES)

( * ) Notice: Subject to any disclaimer, the term of this patent is extended or adjusted under 35 U.S.C. 154(b) by 244 days.

This patent is subject to a terminal disclaimer.

(21) Appl. No.: 12/725,901

(22) Filed: Mar. 17, 2010

(65) Prior Publication Data

US 2011/0019720 A1      Jan. 27, 2011

Related U.S. Application Data

(63) Continuation of application No. 10/344,426, filed as application No. PCT/ES01/00160 on Apr. 27, 2001, now Pat. No. 7,711,032.

(30) Foreign Application Priority Data

Aug. 16, 2000   (ES) ..................................... 20002086

(51) Int. Cl.
*H04B 1/69*          (2011.01)
(52) U.S. Cl. ....................................................... 375/146
(58) Field of Classification Search .................. 375/130, 375/140, 147, 148, 146
See application file for complete search history.

(56) References Cited

U.S. PATENT DOCUMENTS

| | | | |
|---|---|---|---|
| 3,751,596 A | 8/1973 | Tseng | |
| 3,889,065 A | 6/1975 | Alsub | |
| 5,353,110 A | 10/1994 | Jones | |
| 5,668,795 A | 9/1997 | Magil et al. | |
| 6,095,977 A | 8/2000 | Hall et al. | |
| 6,301,221 B1 | 10/2001 | Paterson | |
| 6,452,958 B1 | 9/2002 | Van Nee | |
| 6,487,258 B1 | 11/2002 | Jedwab et al. | |
| 6,567,482 B1 | 5/2003 | Popovic | |
| 6,567,487 B1 | 5/2003 | Pilz | |
| 7,062,002 B1 | 6/2006 | Michel et al. | |

FOREIGN PATENT DOCUMENTS

| | | |
|---|---|---|
| EP | 0952461 | 10/1999 |
| JP | 09093295 | 4/1997 |

OTHER PUBLICATIONS

Cornelia et al., "A Construction of OFDM 16-QAM Sequences Having Low Peak Power, " *IEEE Transaction on Information Theory*, 47(5), Jul. 2001, 2091-2094.
Golay, "Complementary Series," *IRE Transaction of Information Theory*, Apr. 1961, 82-87.
Popovic, "Efficient Golay Correlator". *Electronics Letters* 35(17), Aug. 19, 1999:1427-1428.

*Primary Examiner* — Tesfaldet Bocure
(74) *Attorney, Agent, or Firm* — McCracken & Frank LLC

(57) ABSTRACT

The frequency spectrum of a transmitter system is spreaded in the transmitter (1) through the codification of information bits by means of sequence pairs of Golay complementary sequences. The spectrum is received in the receiver (2) and is subject to a filter, which is adapted to the features of such sequences enabling the detection of digital levels corresponding to the original transmitted information. If pairs of orthogonal sequences, A amplitudes for modulating data, and N-PSK modulation are used, it is possible to get a transmission speed (C) equal to:
Where B is to the null-to-null spread bandwidth used in Hertz. It allows an improvement in quality as compared to other digital-communication systems, which use spread spectrum techniques and CDMA, obtaining a process gain independent of the transmission speed.

18 Claims, 3 Drawing Sheets

METHOD, TRANSMITTER AND RECEIVER FOR SPREAD-SPECTRUM DIGITAL COMMUNICATION BY GOLAY COMPLEMENTARY SEQUENCE

CROSS-REFERENCE TO RELATED APPLICATION

The present application is a continuation of application No. 10/344,426, filed Feb. 12, 2003, now U.S. Pat. No. 7,711,032, issued May 4, 2010, which resulted from a national phase application based on PCT/ES01/00160, filed Apr. 27, 2001, which in turn claims priority of Spanish application no. P20002086, filed Aug. 16, 2000. These patents and patent applications are incorporated herein by reference in their entirety.

BACKGROUND OF THE INVENTION

The present invention refers to the modulation and demodulation method, as well as the transmitter and receiver which makes it possible to transmit and receive data by means of any transmission means, particularly when it is necessary or preferable to use spread spectrum techniques.

The spread spectrum concept was developed for use in military communications due to its immunity features towards noise and interference. Its principle is based on the use of certain binary sequences having certain features similar to noise and which, however, a receiver which knows said sequence is capable to detect as a signal. In the same manner, the compression of impulses by means of binary sequences is useful also in RADAR, SONAR, and echography applications since it allows to improve the resolution of the detected objects. However, in recent years its use has become widespread in space applications and civil communications such as mobile telephony, DS-CDMA (Direct Sequence Code-Division Multiple Access), radio telephone access loops, Internet access, wireless local area networks, deep space communications, etc. all of which are based on digital modulation by means of using sequences which are suitable for this type of applications due to their autocorrelation and cross-relation features. Therefore international organizations (IEEE, UIT, etc.), have begun normalizing and standardizing modulation systems which facilitates the use of certain sequences to modulate the transmitted binary data and thus obtain characteristics which makes it possible to use, among others, certain frequencies reserved for industrial, scientific and medical applications (ISM bands) and whose use and exploitation do not require any kind of administrative license. The need to send as much information as possible with the same bandwidth has made the telecommunications industry to develop commercial applications which use the IEEE 802.11 standard for the transmission of information by radio in local networks obtaining increasingly higher speeds by means of the use of binary sequences such as the 11-bit Barker (to obtain a minimum processing gain of 10.4 dB) or 8-bit Walsh, and different modulation techniques (BPSK, QPSK, MBOK, QMBOK, etc.) which makes it possible to attain transmission speeds of up to 11 Mbps. This standard makes it possible to work within three frequency bands with a null-to-null bandwidth of 22 MHz, in the so-called 2.4 GHz band.

Likewise, reliable transmission methods are needed for the so-called deep space communications between spaceships and the bases on Earth, allowing a big processing gain due to the need to limit the emission power of the ship's transmission equipment, and due to the reduced signal to noise ratio of said signals when they are received.

In the present applications (FIG. 1) the length of the coding sequence (Barker, PN, Walsh, etc.) determines both the processing gain and the bandwidth used. Generally, the transmission speed will be reduced if we attempt to increase the processing gain, which is why a compromise between the two parameters must always be found. The transmission speed may be increased by increasing the number of modulation phases, however, the restrictions of this technique increase with the decrease in the signal to noise ratio during reception.

Based on the above it can be deduced that there is a need for a spread spectrum digital modulation technique which on the one hand makes it possible to increase transmission speed and on the other to obtain a bigger processing gain to make it possible to reduce the needed transmission power or improve the signal to noise ratio during reception, and at the same time to reduce the complexity of the present modulation tables.

No patent or utility model whatsoever is known whose features are the object of the present invention.

BRIEF SUMMARY OF THE INVENTION

The present invention uses pairs of Golay complementary sequences for the modulation by means of spread spectrum and DS-CDMA of the amplitude modulated binary data in combination with an N-PSK modulation widely used in digital communication systems.

The main property of the sequences used in this invention is that in contrast to the Barker sequences, which have side lobes, the Golay sequences are characterized by an ideal autocorrelation, that is, they correspond to a perfect Kronecker delta so that they meet:

where CA and CB are the individual autocorrelations of A and B sequences of the pair of selected Golay complementary sequences, M length; and whose values belong to the bivalued set (1,−1).

The generation of such sequences is based on the so-called kernel basics of 2, 10 and 26 bits, known hitherto (the rules of Golay sequence generation are discussed in the article called "Complementary Sequences" by M.J.E. Golay, published in IRE Transactions on Information Theory, vol. IT-7, pp. 82-87, April 1961).

The communication system object of the present invention makes it possible to establish a physical end-to-end or end-to-multipoint connection at a transmission rate, which will depend on the employed means and on the available bandwidth and on the acceptable error rate.

It consists of two pieces of equipment or devices: One is a transmitter and the other one is a receiver.

The transmitter equipment is used to perform the following tasks:

Receive the data and generate the symbols corresponding to each group of (m) bits as a function of the Golay sequence number ($\eta$) of the selected length (M), number of amplitudes (A) per symbol, number of phases (N) used for the modulation and processing gain needed to comply with the quality requirements of the system.

Carry out the adding up of the different phases to form an N-PSK modulation and thus generating the transmission signal.

Transmit the composite signal to the transmitter means for example by means of an RF stage and antenna.

The receiver equipment is used to perform the following operations:

Demodulate the N-PSK information and extract the components of each of the different phases.

Adapt, filter and correlate the extracted components with their corresponding complementary pairs or Golay.

Sum up the correlations and thus obtain the original data stream as digital levels.

Perform the level decoding to obtain the original data.

The first advantage of this method is that of being able to obtain as big a processing gain as one wishes, independently, as will be seen later, of the transmission rate, and only by increasing the length of the selected Golay sequences, for which reason high transmission power is not needed to obtain a high signal to noise ratio during reception. The processing gain (in decibel) in this case is defined as:

where M corresponds to the length of the Golay sequences used in the modulation. This feature is very important in applications where a low transmission power is desired (portable terminals, space ships and communication satellites), the communication is performed over great distances (deep space transmissions), and even military applications in which the interferences caused by the enemy or the need to encrypt the transmission determine the security and quality of the communication.

Furthermore, this method makes it possible to transmit simultaneous information flows in the same frequency bands over the channel by means of using η different low cross-correlation Golay sequences, thus facilitating the creation of η communication sub networks within a same band, or to multiply the transmission rate by a factor proportional to η.

Likewise, it is possible to increase the transmission rate even more if a prior amplitude modulation of the entry data by means of A amplitudes is performed.

Therefore, from the aforementioned it can be deduced that the transmission speed or capacity (C), that can be obtained in a spread spectrum communication system using this method will be:

Where B (Hertz) is the null-to-null bandwidth used, N is the number of phases used in the modulation (power of 4), A is the number of amplitudes used in the binary data encoding and η is the number of pairs of Golay complementary sequences used. In the previous expression it is observed that C is independent of M.

Therefore, the described invention constitutes a powerful communication system for use in spread spectrum applications, DS-CDMA, hostile environments, when restrictions on the transmission power exists, or simply when there is a wish to improve the quality of the communication without a transmission rate degradation.

DETAILED DESCRIPTION OF THE INVENTION

A possible embodiment of this method applied to an end-to-end open-air radio communication system is shown below. For reasons of clarity the implementation in this case of a QPSK transmitter (N=4) is outlined in FIG. 2, performing data modulation using η Golay sequences, amplitude modulated by means of A amplitudes. Therefore, by applying the formula (1.2), the transmission rate will be:

In accordance with what has been explained above, the starting point is a set of η pairs of Golay sequences of M bits generated and stored in the transmitter by means of, generally, 2×η binary registers (values 1 and −1) which we aim to amplitude modulate with A amplitudes and with 4 Q-PSK phases (4-PSK). In the same FIG. 2 one of the basic modulator blocks (BMB) of which the transmitter consists is shown in detail.

Figure 1A:
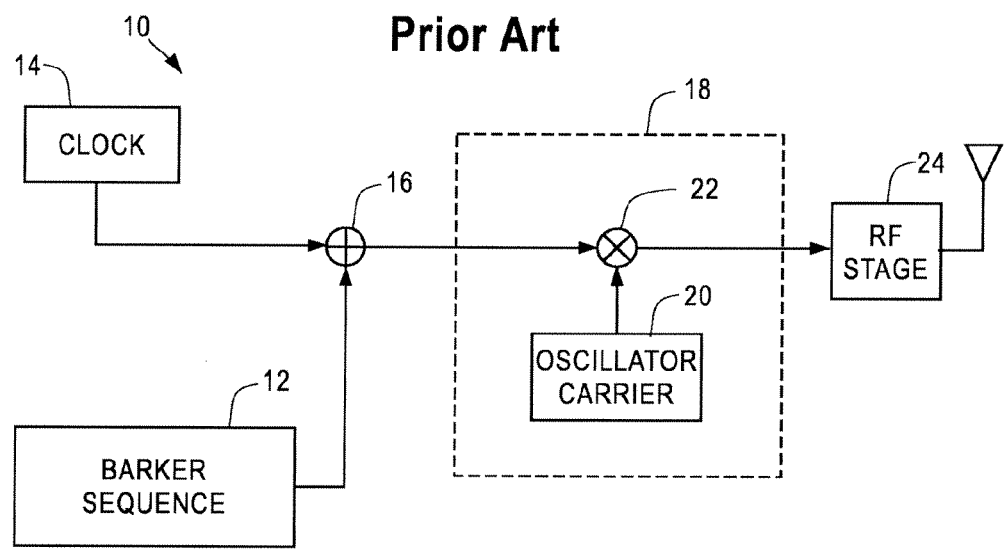
FIG. 1 shows the present prior art basic transmission technique of a spread spectrum system and particularly using an 11-bit Barker sequence, which by means of a exclusive OR function performs the spreading of the spectrum of the original data signal, e wherein the bit frequency is 11 times lower to the one used for the Barker sequence, which makes it possible to obtain a processing gain of 10.log10 (11)~10.4 dB.
Figure 1B:
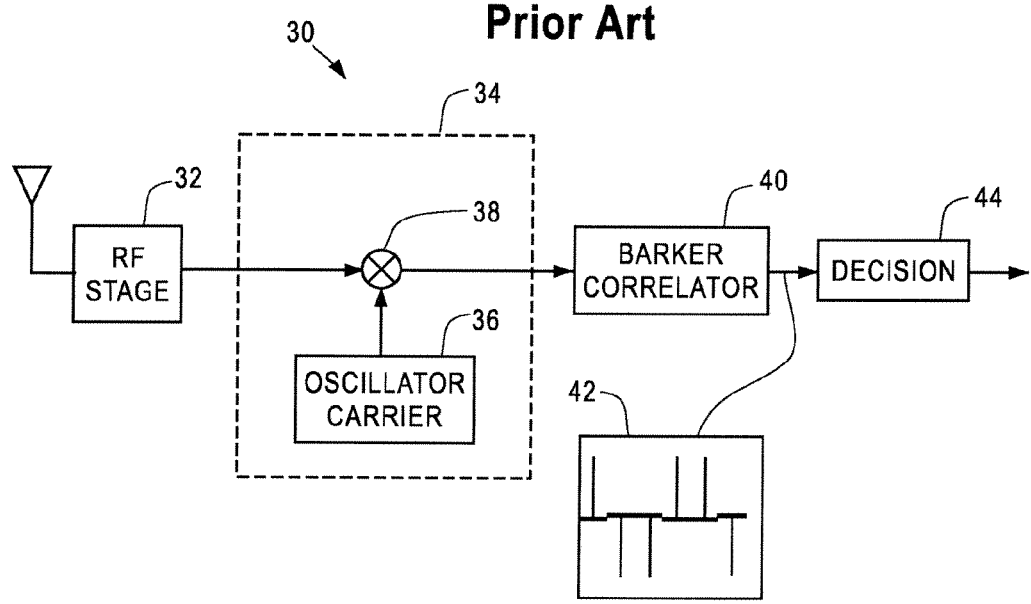
Figure 2:
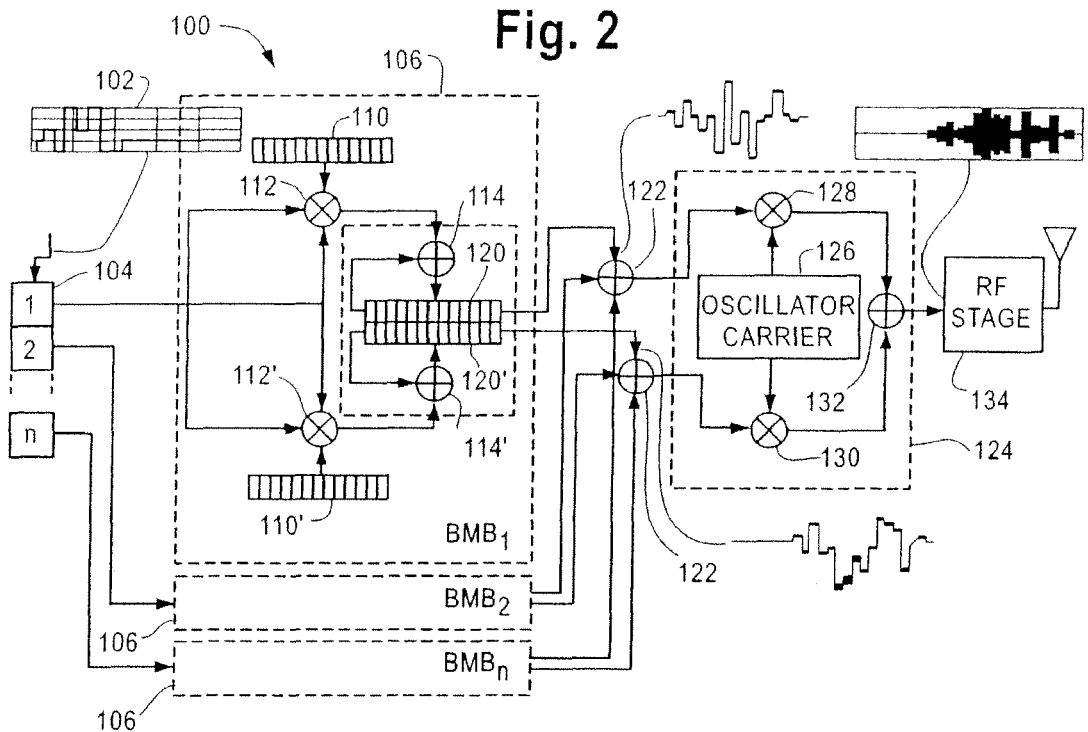
FIG. 2 shows the basic elements of the transmission method and a possible implementation of the transmitter, which uses this method for N=4.

Referring to FIG. 2, Binary data (1) enter the transmitter in groups of η×m bits. Each i group of m bits multiply with a symbol (3) both A and B Golay sequences (2) corresponding to the i BMB number. The results of these two multipliers are independently accumulated to each one of the phases, and in each element, within the shift register (4) and are right-shifted for the receiving of the following symbol.

The output signals of the shift register of each BMB are added (5) and the result modulated in phase and quadrature by means of the product with, for example, a sine and cosine symbol (6). The result is sent to a conventional transmission stage (7).

The transmitter performs the following operations where R is the transmission rate in symbols:

(1) Encoder: The NRZ digital data received at D×m×R bits/sec. arrive encoded and are grouped in η groups of m=log2 A bits. Each BMB processes in parallel a group of m bits, so that the system will transmit η×m bits per symbol. The bit with the highest weight of each group corresponds to the sign, and the m−1 of less weight, to the module.

(2) Golay register: Formed by two binary registers of M length which store the pair of A and B complementary sequences, whose values belong to the set (1,−1), which will modulate the data processed by the corresponding BMB.

(3) Multiplier: Consists of two multipliers with sign (highest weight bit) of the pair of A and B Golay sequences of the BMB with the arithmetic value of the corresponding group within the set of groups of the input symbol.

(4) Double accumulator and shift register: Perform the arithmetic summing of the result of the multipliers with the content of the double shift register (the upper path with A and the inner path with B) and shifts a register to the right for each symbol cycle, updating the register, located furthest to the left of the same, to the value of zero. The shift register is formed by basic elements which store signal values, and therefore, the number (η) of bits used in each basic element of said register must be dimensioned to avoid overflow during the accumulation operations. Thus, the number of elements in the shift register must be equal to or higher than M for each of the paths A and B.

(5) Adder: Independently sums up the data corresponding to the output of each shift register of each of the BMBs thus obtaining the total IT and QT signals which are afterwards modulated.

(6) QPSK modulator: Modulates the output signals from the adder by multiplying the exit signals of the adders by two quadrature symbols, for example, a sinusoidal symbol with phase Φ0 (via IT) and another quadrature (via QT), and adding the result of both phases, thus obtaining the transmission signal in QPSK.

(7) Exit stage: Consists of a D/A converter stage and a conventional radio frequency stage, for example, sending the signal to the transmission means.

Figure 3:
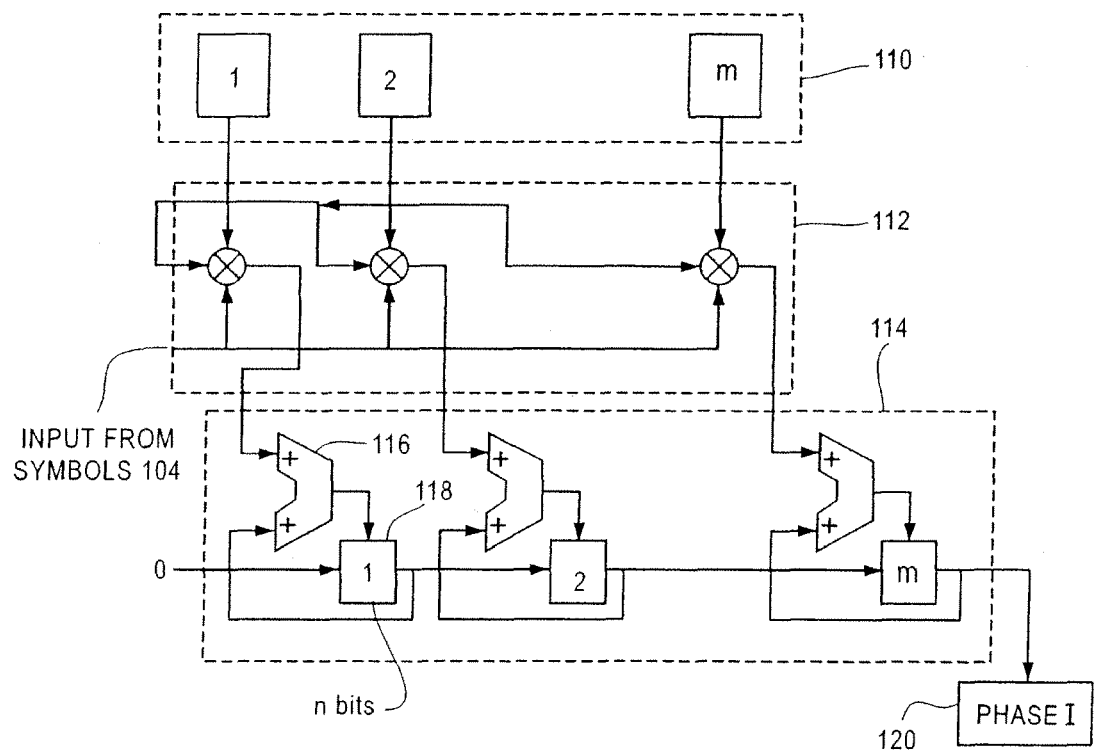
FIG. 3 shows a basic outline of the reception method and, particularly, an example of the receiver apparatus, which uses this method for N=4.

Referring to FIG. 3, Both phases are reduced by a 4-PSK demodulation obtaining one in-phase signal and another in quadrature (1). The obtained analogue in-phase (I) and quadrature (Q) are quantified and introduced into all BDBs, and the result of both signals is correlated with the corresponding original sequences (2), the sum (3) of both flows will provide us with an amplitude-coded signal corresponding to the data of each original m bit subgroup, which are demodulated. A multiplexer block (4) manages the decoding and arrangements of the bits to recover the original data flow.

FIG. 3 shows an example outline of a receiver for N=4, which is formed by η basic demodulator blocks (BDB) detailed in the same figure, and the structure of the receiver which consists of the following blocks:

(1) QPSK receiver: Amplifies the RF input signal and, if necessary, converts the signal to an intermediate frequency (IF), obtains the phase information and makes it possible to demodulate and recover the different flows in-phase I and quadrature Q corresponding to the phases and . The I and Q signals are digitized and their output passed on to the correlator blocks. This block is common for all of the BDBs.

(2) Golay correlators: Make it possible to correlate the different flows received with their corresponding Golay sequences. Given that the sequences are normalized between +1 and −1, the correlation is reduced to performing adding and subtraction.

(3) Adder and detector: Performs the adding up of the correlations, two and two, so that the result are the original amplitude modulated data. These are thresholded and converted into binary data generated at the symbol rate at the output of each block.

(4) Decoder: Performs the grouping of the η groups received within the data stream, corresponding to the transmitted data in the order in which they were transmitted at η×m×R bits/sec.

Both devices together make up the transmission system.

Figure 4:
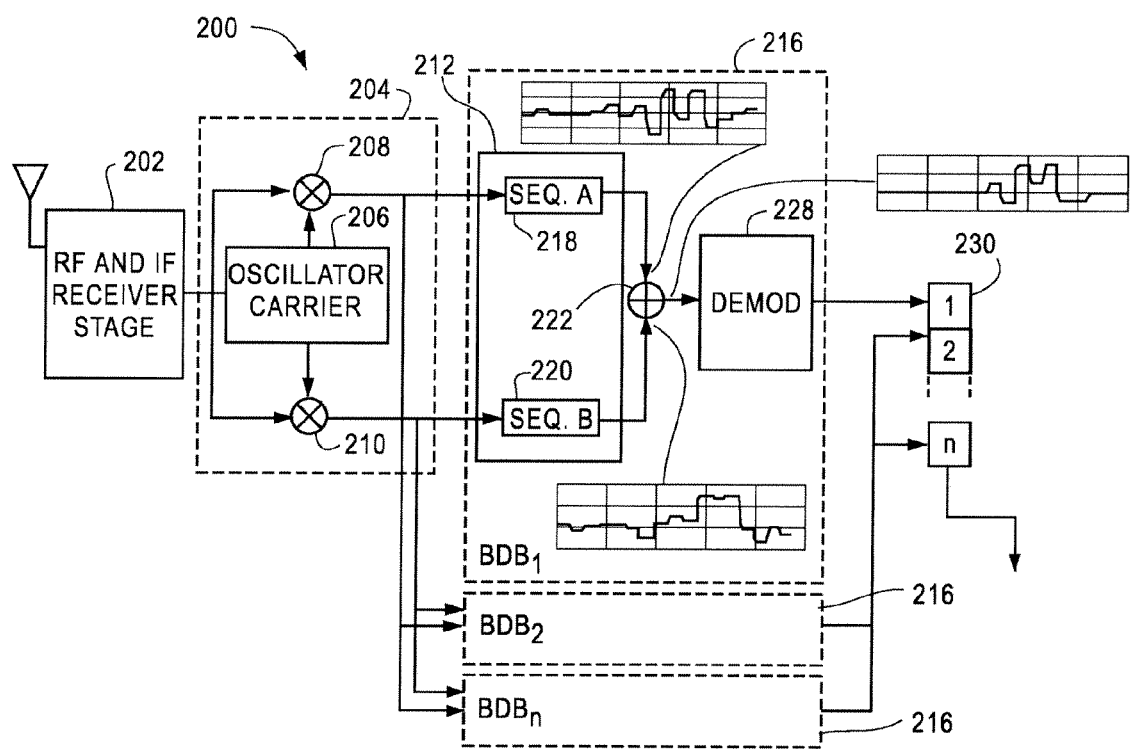
FIG. 4 corresponds to a possible embodiment of the modulation, for the sake of simplification only the embodiment of phase 1 is shown.

Referring to FIG. 4, Phase Q is identical but modulating with the complementary sequence. Therefore, only one of the Golay registers (1), one of the accumulators and shift registers (2) and one multiplier (3) is shown.

The invention claimed is:

1. A device for spread spectrum digital communication by Golay complementary sequence modulation, comprising:
   a processor;
   a memory; and
   wherein the memory contains instructions that, when executed by the processor, perform the following steps:
      receiving information comprising binary data for transmission through a communication channel,
      encoding and dividing said received binary data into symbols for spread spectrum transmission,
      modulating and encoding each symbol separately using Golay complementary sequences to generate a Golay sequence modulated binary data signal by (a) generating η binary Golay sequences and encoding each symbol of said received binary data with one of the η binary Golay sequences as entry data with low cross-correlation of the Golay sequences to generate an output signal, and (b) modulating said output signal with N-PSK modulation to generate the Golay sequence modulated binary data signal,
      using a double accumulator and shift register, including elements accumulating and displacing said sequences generated in order to obtain different phases, and
      transmitting said Golay sequence modulated binary data signal through said communication channel.

2. The device of claim 1, wherein said transmission of information occurs by generating binary sequences for spread spectrum application which use said Golay complementary sequences which are normalized between +1 and −1.

3. The device of claim 1, wherein said transmission of information occurs by generating binary sequences for said spread spectrum applications using Golay complementary sequences and adding said Golay complementary sequences unchanged or with changed sign and position, displaced within each said transmission symbol.

4. The device of claim 1, wherein said transmission of information occurs by use of a transmitter generating said binary sequences for spread spectrum applications by multiplying said Golay complementary sequences modulated by said amplitude values A, representing digital input, thereby multiplying a quantity of information bits per symbol interval by $m = \log_2 A$.

5. The device according to claim 1, wherein the processor performs further the step of generating binary sequences of spread spectrum applications, thereby generating a processing gain in decibels equal to: $10 \log_{10}(2M)$ dB, where M is the length of said selected Golay sequences.

6. The device according to claim 1, wherein the processor performs further the steps of adding with an adder all elements generated in said phases, whether said elements are generated all together, or in any combination thereof, and obtaining the signals which are subsequently modulated by means of said N-PSK modulation and which said signals are transmitted through a transmission medium by means of a conventional radio frequency stage.

7. The device of claim 6 further comprising the step of using at least one of Golay sequences or Golay Code Modulation sequences "GCM" wherein said step further comprises using said transmission step to modulate and transmit information of a data flow at a transmission rate of $C = \eta \log_2 A \cdot 1/2 \cdot \log_2 N \cdot B/2$ bits/second, where η is defined as the number of Golay pairs used, A is defined as the number of amplitudes used to modulate the input data, N (power of 4) is defined as the number of phases used in the modulation and B is defined as the null-to-null bandwidth used in the N-PSK modulation.

8. The claim 1, wherein each of the symbols include M bits corresponding to the M bits of the Golay sequence.

9. The device of claim 1, wherein the Golay complementary sequences are stored in a register in a modulator block.

10. The device of claim 1, wherein the step of modulating and encoding each symbol separately using Golay complementary sequences occurs in a modulator block.

11. The device of claim 1, wherein each of the symbols encoded by the complementary Golay sequences for each of the η binary Golay sequences are added by phase.

12. A device for spread spectrum digital communication, comprising the steps of:
   a processor;
   a memory; and
   wherein the memory contains instructions that, when executed, perform the following steps,
      providing a plurality of bits that are representative of a signal to be transmitted through a communications channel;
      separating the plurality of bits into n groups of M bits,
      providing a number of Golay complementary sequences equal to n,
      for each Golay complementary sequence, separately convolving the bits of each group with at least first and second sequences that form each one of the Golay complementary sequences, adding together the bits of each group that are convolved with the first sequence of each one of the Golay complementary sequences to produce a first signal, adding together the bits of each group that are convolved with the second sequence of each one of the Golay complementary sequences to produce a second signal, modulating the first and second signals, and transmitting the modulated first and second signals over the communications channel.

13. The device of claim 12, wherein each Golay complementary sequence is formed by only two different sequences.

14. The device of claim 12, wherein each one of the Golay complementary sequences are normalized between +1 and −1.

15. The device of claim 12, further comprising the step of using a double accumulator and shift register, including elements accumulating and displacing said Golay complementary sequences generated in order to obtain different phases.

16. The device of claim 12, wherein the first and second signals are modulated using N-PSK modulation.

17. The device of claim 12, wherein each group of bits has the same number of M bits per group.

18. The device of claim 12, wherein the Golay complementary sequences are stored in a register in a modulator block.

* * * * *